(12) United States Patent
Wiegmann et al.

(10) Patent No.: US 8,986,864 B2
(45) Date of Patent: Mar. 24, 2015

(54) BATTERY WITH HOUSING AND DEGASSING SYSTEM

(75) Inventors: Martin Wiegmann, Borstel (DE); Ralf Joswig, Buchholz (DE)

(73) Assignee: Johnson Controls Hybrid and Recycling GmbH, Hannover (DE)

( * ) Notice: Subject to any disclaimer, the term of this patent is extended or adjusted under 35 U.S.C. 154(b) by 619 days.

(21) Appl. No.: 12/969,490

(22) Filed: Dec. 15, 2010

(65) Prior Publication Data

US 2011/0135978 A1   Jun. 9, 2011

Related U.S. Application Data

(63) Continuation-in-part of application No. PCT/EP2009/003823, filed on May 28, 2009.

(51) Int. Cl.
*H01M 2/12* (2006.01)
*H01M 2/36* (2006.01)
*H01M 2/02* (2006.01)
*H01M 2/10* (2006.01)

(52) U.S. Cl.
CPC .......... *H01M 2/1083* (2013.01); *H01M 2/1072* (2013.01); *H01M 2/1223* (2013.01); *H01M 2/1247* (2013.01); *H01M 2/36* (2013.01)
USPC .................. 429/82; 429/76; 429/176

(58) Field of Classification Search
CPC ....................................................... H01M 2/1247
USPC ................... 429/53–55, 76, 82–89; 307/10.7
See application file for complete search history.

(56) References Cited

U.S. PATENT DOCUMENTS 5,187,746 A    2/1993  Narisawa
5,278,002 A *  1/1994  Hiers ............................ 429/175

FOREIGN PATENT DOCUMENTS

| EP | 1876661 A1 * | 1/2008 |
| GB | 213698 | 4/1924 |
| GB | 399061 | 9/1933 |
| GB | 1 268 097 | 3/1972 |

OTHER PUBLICATIONS

International Preliminary Report on Patentability for Application No. PCT/EP2009/003823, date of issuanve Jan. 18, 2011, 12 pages.
International Search Report for Application No. PCT/EP/003823, mailing date Jul. 28, 2009, 4 pages.
Response to Office Action for European Application No. 09765522. 9, dated Feb. 9, 2011, 6 pages.

* cited by examiner

*Primary Examiner* — Maria J Laios
*Assistant Examiner* — Robert S Carrico
(74) *Attorney, Agent, or Firm* — Foley & Lardner LLP

(57) ABSTRACT

A battery housing for a hybrid vehicle battery includes a degassing system on a floor of the housing. The degassing system includes a base body configured for attachment to the floor, where the base body includes an opening in an upper section and is at least partially permeable to a liquid in a lower section. The degassing system also includes a guide in the base body and a float provided in the base body. The guide is configured to guide the float.

20 Claims, 5 Drawing Sheets

BATTERY WITH HOUSING AND DEGASSING SYSTEM

CROSS-REFERENCE TO RELATED PATENT APPLICATIONS

The present application is a Continuation-in-Part of International Patent Application PCT/EP2009/003823 filed May 28, 2009 which claims the benefit of and priority to German Patent Application DE 10 2008 028 430.0 filed Jun. 17, 2008. The entire disclosures of International Patent Application PCT/EP2009/003823 and German Patent Application DE 10 2008 028 430.0 are incorporated herein by reference in their entireties.

BACKGROUND

The present application relates to accumulators (i.e., batteries or electrochemical cells) and components thereof. In particular, the present application relates to an accumulator housing (i.e., a battery or electrochemical cell housing) having a degassing system and an accumulator (i.e., battery or electrochemical cell) having an accumulator housing, in particular for hybrid accumulators, nickel metal hybrid accumulators and lithium ion accumulators.

High-power accumulators with high energy densities in the galvanic cells are used, in particular, in hybrid vehicles and in electric vehicles.

The high-energy densities give rise to a large generation of heat. In order to maintain the efficiency of the accumulators and to be able to ensure said efficiency in a wide operating window, there is a need for effective cooling of the accumulators. In addition, it is necessary for the accumulators to have a safety system which intervenes when the accumulators overheat in order, in particular, to prevent the cells from exploding.

In addition to effective cooling and a safety system for protecting against overheating, high-power accumulators require a safety system for protecting the accumulator against gas overpressure in the accumulator. The gas overpressure can lead to sudden reactions and to the accumulator igniting. As a result, people may be injured and the environment damaged.

Furthermore, the interior of the accumulators has to be protected against dust and spray water which is caused, for example, by high pressure cleaners or steam jet devices.

It would therefore be advantageous to make available an accumulator housing and an accumulator which are effectively protected against a gas overpressure and against external contamination.

SUMMARY

An exemplary embodiment relates to a battery housing for a hybrid vehicle battery that includes a degassing system on a floor of the housing. The degassing system includes a base body configured for attachment to the floor, where the base body includes an opening in an upper section and is at least partially permeable to a liquid in a lower section. The degassing system also includes a guide in the base body and a float provided in the base body, and the guide is configured to guide the float.

Another exemplary embodiment relates to a battery for a hybrid vehicle that includes a housing and a degassing system on a floor of the housing. The degassing system includes a base body configured for attachment to the floor, where the base body includes an opening in an upper section and is at least partially permeable to a liquid in a lower section. The degassing system also includes a guide in the base body and a float provided in the base body. The guide is configured to guide the float.

BRIEF DESCRIPTION OF THE DRAWINGS

The invention will be explained in more detail on the basis of an exemplary embodiment illustrated in the following Figures, of which.

DETAILED DESCRIPTION

Figure 1:
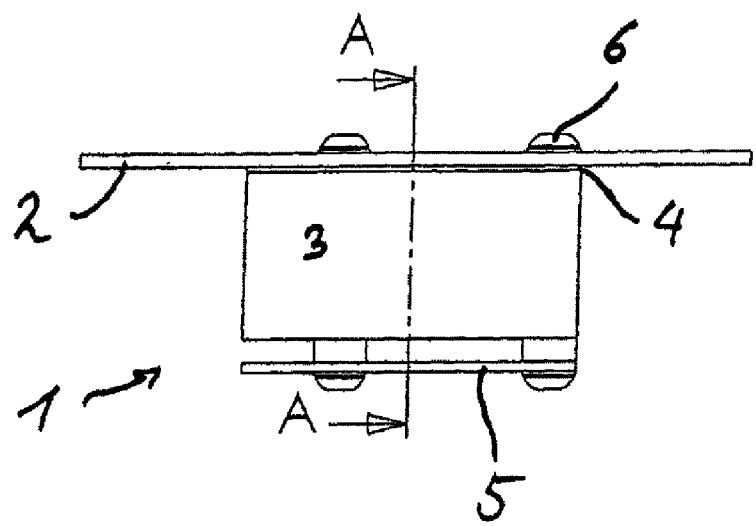
FIG. 1 shows a plan view of a degassing system according to an exemplary embodiment.

According to an exemplary embodiment, a degassing system permits, owing to the float which is movably arranged in the guide, a rapid pressure equalization between the interior of the accumulator and surroundings of the accumulator if, for example, a cell releases a large quantity of gas owing to overloading, a short-circuit or similar causes. The rising pressure is reliably reduced in the inventive degassing system via the openings.

Furthermore, condensation water which collects on the floor of the accumulator can also escape via these openings.

In addition, spray water coming from the outside is caused, for example, by high pressure cleaners or steam jet devices, and further contamination is held back by means of the float system so that it does not penetrate the interior of the accumulator. The degassing system is therefore suitable for improving the fording capability of vehicles. Fording capability is understood to be the capability of nonfloatable vehicles to overcome water obstacles and mud obstacles without special preparation. For example, the degassing system can advantageously be used in SUVs (Sport Utility Vehicles).

If a level of liquid from the outside increases, the float is pressed into the opening arranged above the float and seals off the opening. The interior of the accumulator is therefore effectively protected against the ingress of liquid.

A simple and cost-effective method of manufacture is obtained if a cage which accommodates the guide is arranged in the base body. The cage and the base body can be fabricated from different materials, for example the cage can be fabricated from cost-effective plastic and the base body from metal.

Simple assembly is achieved by virtue of the fact that the cage has an upper part and a lower part, wherein the upper part has an opening, and the lower part is at least partially permeable to a liquid. The multi-part design of the cage also makes partial replacement possible, for example in the case of repair work and maintenance work.

An effective seal for contamination, in particular spray water, can be obtained if the opening of the upper part is provided with a seal.

In one embodiment, the opening of the upper part is circular (in plan view, i.e. from the direction of the interior of the accumulator). The float is expediently a sphere in this case. A circular opening and a sphere as a float have good sealing properties owing to their rotational symmetry, which is independent of the relative orientation about an axis of symmetry of the opening and of the float. The seal can be improved further if the opening is embodied in the form of a truncated cone whose larger base surface is directed towards the sphere. In this case, the sphere is guided along the lateral surface and into the opening when a level of liquid rises outside the accumulator and presses the sphere upward.

The sphere can be guided well if the guide comprises a plurality of guide webs which are arranged essentially in a lateral surface of a virtual cylinder, where both cylinders have an internal diameter which corresponds approximately to the diameter of the sphere. The internal diameter of the virtual cylinder and the diameter of the sphere are matched to one another in such a way that the sphere is not impeded in its guidance by the guide webs and at the same time good guidance is obtained.

Dust penetrating from the outside is effectively held back by a filter screen which is arranged on the lower part of the cage. The filter screen also permits liquids, for example condensation water, to be able to penetrate toward the outside from the interior of the accumulator.

In one embodiment, the degassing system has a circular cross section in plan view. In this case, the base body is expediently embodied in the form of a hollow cylinder.

An impact baffle, which reduces, for example, a direct jet of a high-pressure cleaner or steam jet device on the float system, is expediently arranged underneath the base body.

FIG. 1 shows a degassing system 1 according to an exemplary embodiment. The degassing system 1 is attached to a housing floor 2 of an accumulator.

The degassing system 1 has a base body 3. A seal 4 is arranged between the housing floor 2 and the base body 3. The base body 3 is fabricated from a material which gives the degassing system 1 sufficient stability, for example from metal.

An impact baffle 5 is arranged underneath the base body 3 at a distance. The impact baffle 5 serves as an additional protection against direct external contamination such as, for example, spray water.

The impact baffle 5 and the seal 4 are releasably or removably connected together with screws 6 on the housing floor 2. Alternatively, a nonreleasable or nonremovable bonded connection or welded connection is also conceivable. Nonreleasable means in this context that the components cannot be separated from one another without damage. The screws are guided through drill holes which are formed in the base body 3.

In the interior of the base body 3 there is a cage 7. The cage has an upper part 8 and a lower part 9. The upper part 8 and the lower part 9 are separate components in order, if appropriate, to be able to more easily perform repairs or maintenance work on the degassing system 1. However, it is also conceivable for the upper part 8 and the lower part 9 to be embodied in one piece.

In the cage 7 there is a float in the form of a sphere 10. The sphere 10 is made from a material which floats on water in order to be able to carry out the function of a float, for example from a suitable plastic or rubber.

The sphere 10 is guided by a plurality of guide webs 11. For this purpose, the guide webs 11 are arranged essentially perpendicularly along a virtual cylinder lateral surface. The guide webs 11 are plastic injection-molded parts.

A screen mesh 12 is arranged on the inside of the cage 7, on the lower part 9. The screen mesh 12 has essentially the function of holding back contamination from the outside (for example dust). Furthermore, the intention is also to ensure that liquid from the inside of the cage 7 can pass to the outside through the screen mesh 12. For this purpose, openings 13 are also provided in the lower part 9.

The upper part 8 has an opening 14. The opening 14 is in the shape of a truncated cone. A seal 15 is attached along the lateral surface.

Figure 2:
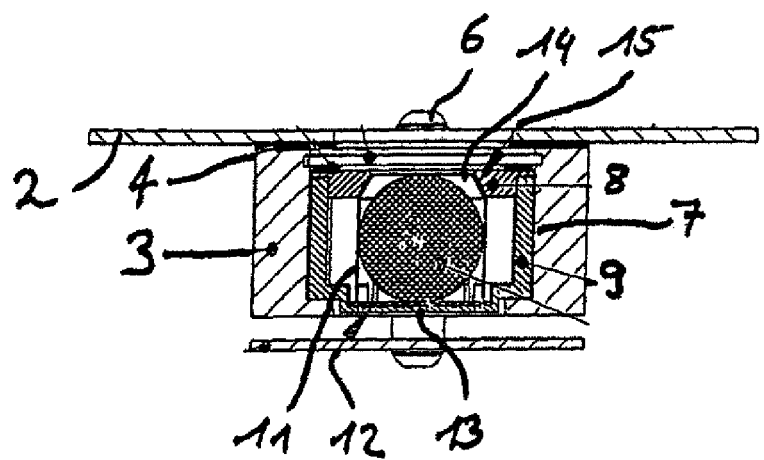
FIG. 2 shows a sectional view in the direction A from FIG. 1.

In FIG. 2 there is no external water level present so that the sphere 10 rests on the screen mesh 12, and the opening 14 is at least partially cleared. Liquids and gases can therefore penetrate to the outside from the interior of the accumulator.

Figure 3:
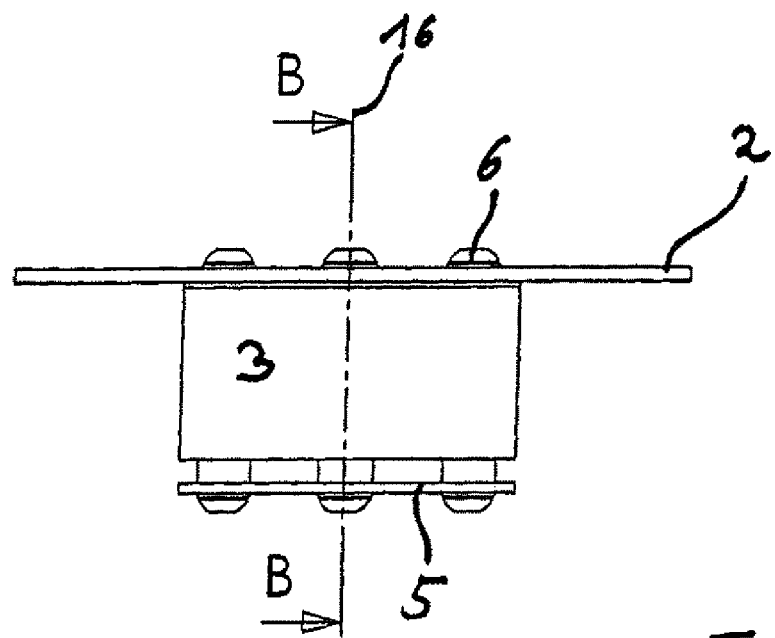
FIG. 3 shows a further side view of the degassing system from FIG. 1.

FIG. 3 shows a further view of the degassing system 1, this time from a view which is rotated about a perpendicular line 16.

Figure 4:
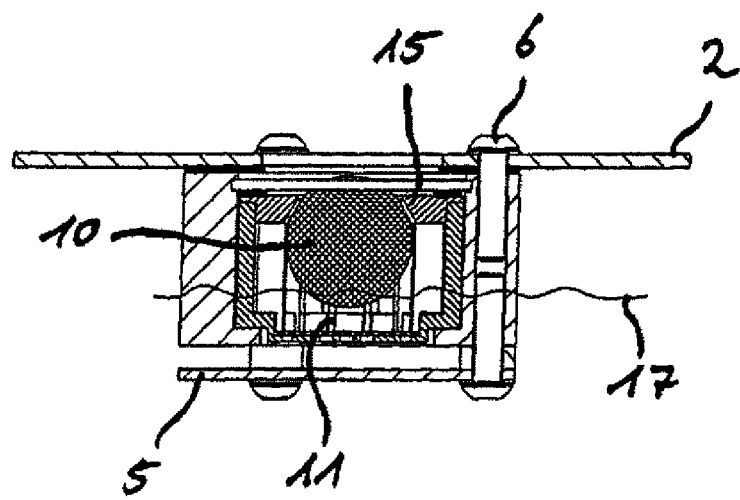
FIG. 4 shows a sectional view in the direction B from FIG. 3.

FIG. 4 illustrates a sectional view in the direction B from FIG. 3.

The interior of the cage 7 is illustrated when an external water level 17 is present.

It is apparent that the sphere 10 is pressed upward by the water level 17 into the truncated-cone-shaped opening 14.

The sphere 10 seals off the opening 14 together with the seal 15 in the opening 14.

Figure 5:
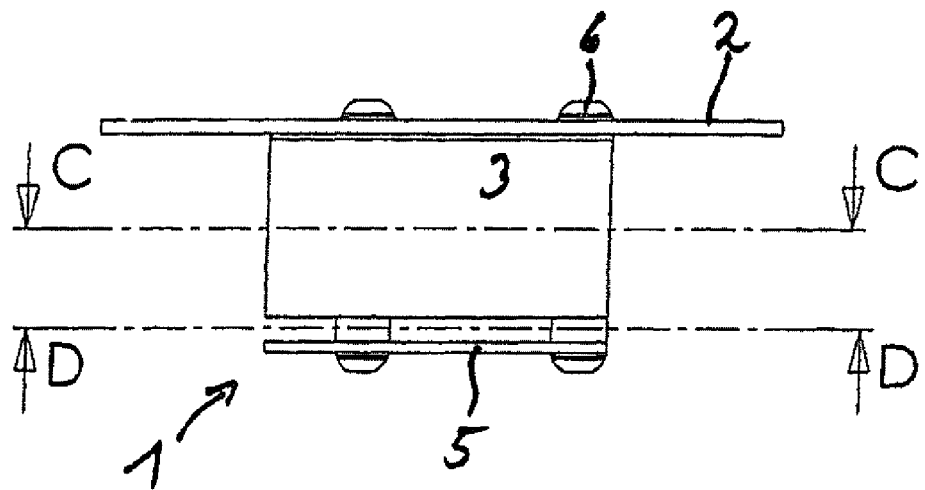
FIG. 5 shows a further side view of the degassing system from FIG. 1.

FIG. 5 shows a further side view of the degassing system 1.

Figure 6:
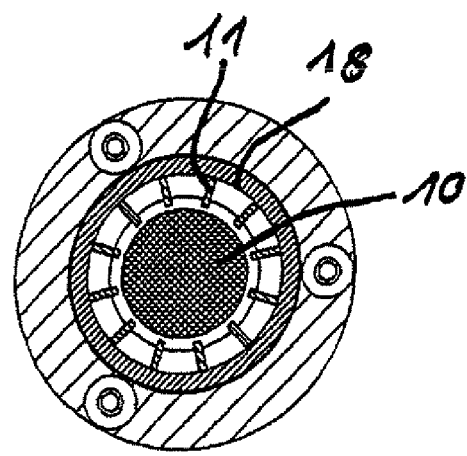
FIG. 6 shows a sectional view in the direction C from FIG. 5.

FIG. 6 is a sectional view in the direction C from FIG. 5.

It is apparent that the guide webs 11 have rectangular cross-sectional surfaces and are arranged essentially radially. The guide webs 11 are arranged essentially at equal angular intervals along a circle 18.

Figure 7:
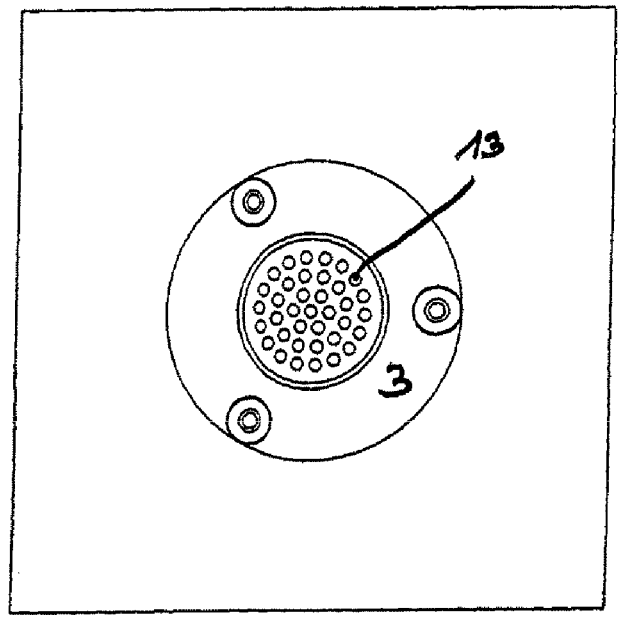
FIG. 7 shows a sectional view in the direction D from FIG. 5.

FIG. 7 shows a sectional view in the direction D from FIG. 5. This figure shows the openings 13 which form a screen-like passage for liquids and gases.

Figure 8:
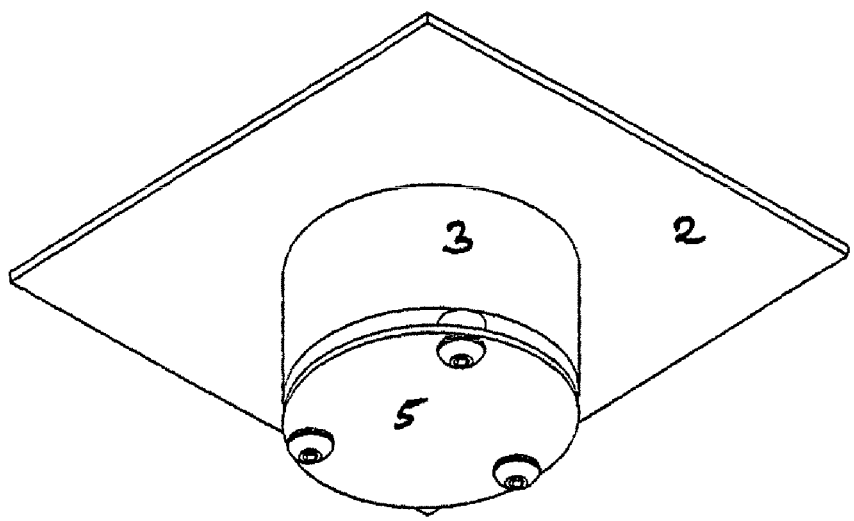
FIG. 8 shows a perspective view from below of the degassing system from the preceding figures.

FIG. 8 is a perspective view of the degassing system 1 from below, i.e. from the outside (with respect to a housing with the housing floor 2). It is apparent that the impact baffle 5 has a circular cross-section surface which has essentially the same diameter as the base body 3.

Figure 9:
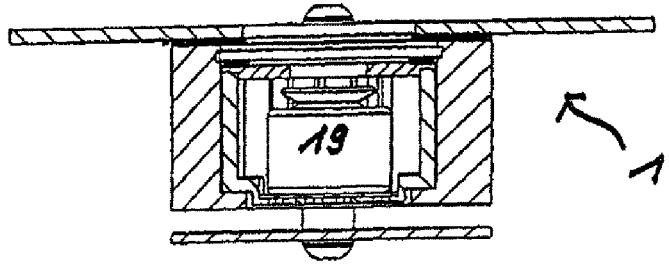
FIG. 9 shows a sectional view of a further embodiment of the degassing system in the opened state.
Figure 10:
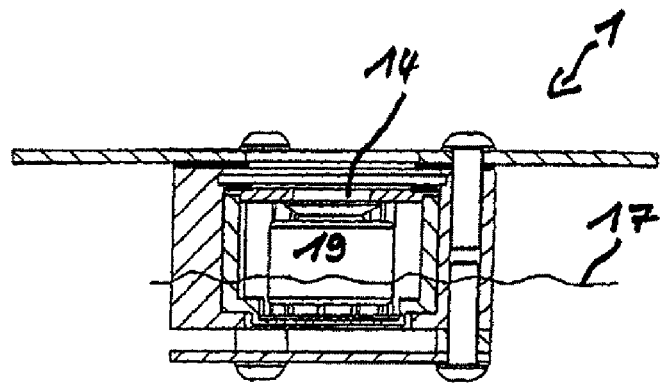
FIG. 10 shows a sectional view of a further embodiment of the degassing system in the closed state.
Figure 11:
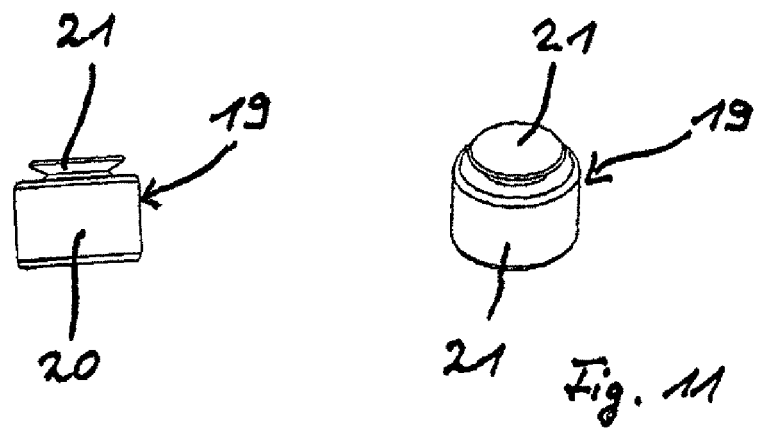
FIG. 11 shows two views of the float from the embodiment according to FIGS. 9 and 10.

In FIGS. 9, 10 and 11, there is a further embodiment of the degassing system 1 according to the invention with an essentially cylindrical float 19.

FIG. 9 shows the degassing system 1 in the opened state. The float 19 rests on a screen mesh 12 in the cage since there is no liquid in the cage 7.

FIG. 10 shows the degassing system 1 in the closed state. The float 19 floats on the liquid which is indicated by the water level 17. The float is pressed via the liquid against the upper part 8 of the cage 7 and therefore closes off the opening 14.

FIG. 11 shows two views of the float 19. The float 19 is composed essentially of a cylindrical first body 20 and a second body 21 in the form of a truncated cone. The second body 21 is fitted in a reversed fashion (that is to say with the smaller base surface) onto the first body 20. The second body 21 is made of a soft material, for example from a rubber or silicone, and serves as a suction element which performs the sealing function.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the accumulator and its features as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery housing for a hybrid vehicle battery that includes a degassing system on a floor of the housing, the degassing system comprising:
    a base body configured for attachment to the floor, such that the base body is below the floor of the battery housing, wherein the base body includes an opening in an upper section and is at least partially permeable to a liquid in a lower section;
    a guide in the base body;
    an impact baffle; and
    a float provided in the base body;
    wherein the guide is configured to guide the float;
    wherein the impact baffle is arranged underneath the base body in order to protect the float provided in the base body.

2. The battery housing of claim 1, wherein the degassing system further comprises a cage in the base body that accommodates the guide.

3. The battery housing of claim 2, wherein the cage has an upper part and a lower part, wherein the upper part has an opening, and the lower part is at least partially permeable to a liquid.

4. The battery housing of claim 3, further comprising a seal along the opening of the upper part.

5. The battery housing of claim 3, wherein the opening of the upper part is circular.

6. The battery housing of claim 2, further comprising a filter screen that is arranged on the lower part of the cage.

7. The battery housing of claim 1, wherein the float is a sphere.

8. The battery housing of claim 7, wherein the guide comprises a plurality of guide webs whose interior surfaces are disposed in a cylindrical configuration, wherein a space between opposing guide webs corresponds to the diameter of the sphere.

9. The battery housing of claim 1, wherein the degassing system has a circular cross section in plan view.

10. The battery housing of claim 1, wherein the degassing system is removably attached to the housing floor.

11. The battery housing of claim 1, wherein the impact baffle is entirely below the base body and is spaced apart from the base body to allow the liquid to reach the opening from outside the base body.

12. A battery for a hybrid vehicle comprising:
    a housing;
    a degassing system on a floor of the housing, the degassing system comprising:
        a base body attached to and arranged below the floor, wherein the base body includes an opening in an upper section and is at least partially permeable to a liquid in a lower section;
        a guide in the base body; and
        a float provided in the base body;
        wherein the guide is configured to guide the float; and
        an impact baffle that is arranged underneath the base body in order to protect the float provided in the base body.

13. The battery of claim 12, wherein the degassing system further comprises a cage in the base body that accommodates the guide, wherein the cage has an upper part and a lower part, wherein the upper part has an opening, and the lower part is at least partially permeable to a liquid.

14. The battery of claim 13, further comprising a seal along the opening of the upper part.

15. The battery of claim 13, wherein the opening of the upper part is circular.

16. The battery of claim 13, further comprising a filter screen that is arranged on the lower part of the cage.

17. The battery of claim 12, wherein the float is a sphere and the guide comprises a plurality of guide webs whose interior surfaces are disposed in a cylindrical configuration, wherein a space between opposing guide webs corresponds to the diameter of the sphere.

18. The battery of claim 12, wherein the degassing system has a circular cross section in plan view.

19. The battery of claim 12, wherein the degassing system is removably attached to the housing floor.

20. The battery of claim 12, wherein the impact baffle is entirely below the base body and is spaced apart from the base body to allow the liquid to reach the opening from outside the base body.

* * * * *